(12) United States Patent
Nelson

(10) Patent No.: US 9,949,589 B2
(45) Date of Patent: Apr. 24, 2018

(54) JUICER COVER

(71) Applicant: Christina Ann Nelson, Lexington, KY (US)

(72) Inventor: Christina Ann Nelson, Lexington, KY (US)

( * ) Notice: Subject to any disclaimer, the term of this patent is extended or adjusted under 35 U.S.C. 154(b) by 830 days.

(21) Appl. No.: 14/302,454

(22) Filed: Jun. 12, 2014

(65) Prior Publication Data

US 2014/0367505 A1    Dec. 18, 2014

Related U.S. Application Data

(60) Provisional application No. 61/834,056, filed on Jun. 12, 2013.

(51) Int. Cl.
| | |
|---|---|
| *A23N 1/00* | (2006.01) |
| *A47J 19/02* | (2006.01) |
| *A47J 31/44* | (2006.01) |
| *A47J 36/06* | (2006.01) |

(52) U.S. Cl.
CPC .............. *A47J 19/027* (2013.01); *A23N 1/00* (2013.01); *A47J 31/4407* (2013.01); *A47J 36/06* (2013.01); *Y10T 29/49826* (2015.01)

(58) Field of Classification Search
CPC ....... A23N 1/00; A47J 19/027; A47J 31/4407; Y10S 220/05; Y10S 220/21
USPC ......................................... 137/377; 222/182
See application file for complete search history.

(56) References Cited

U.S. PATENT DOCUMENTS

| | | | | |
|---|---|---|---|---|
| 1,894,867 A | * | 1/1933 | Hoffman ................ | B61D 5/008 137/377 |
| 2,737,972 A | * | 3/1956 | Callery et al. .......... | F16K 27/12 137/377 |
| 4,285,215 A | * | 8/1981 | Roeder ............... | E21B 41/0021 173/165 |
| 4,832,225 A | * | 5/1989 | Benjamin ............... | A47J 36/06 220/254.1 |
| 5,170,902 A | * | 12/1992 | Wilson ................... | A61B 50/33 206/569 |
| 6,158,626 A | * | 12/2000 | Guerra et al. ........... | B67D 1/06 137/377 |
| 6,594,831 B1 | * | 7/2003 | Pardo et al. ............ | E03C 1/308 4/255.01 |
| D706,578 S | * | 6/2014 | Coakley et al. ............... | D7/412 |

* cited by examiner

*Primary Examiner* — Kevin Lee
(74) *Attorney, Agent, or Firm* — John Alumit

(57) ABSTRACT

A conical shaped juicer cover with two openings is placed over a juicer machine. The first opening is inserted around the juice machine's feeding chute, and the elastic nature of the first opening ensures a snug fit, while also covering any openings in the vicinity of the feeding chute. The second opening extends over the remainder of the juicer machine covering at least a portion of the juicer machine's base and at least the top portion of containers for collecting juice and pulp that are positioned under the juicer machine's pulp ejection spout and juicing spout. The juicer cover is composed of fabric capable of blocking and/or absorbing liquid, and preferably composed of stretch fabric.

7 Claims, 2 Drawing Sheets

JUICER COVER

CROSS-REFERENCE TO RELATED APPLICATION

This present application claims the benefit of Provisional Application No. 61/834,056 filed on Jun. 12, 2013.

FEDERALLY SPONSORED RESEARCH

Not Applicable

SEQUENCE LISTING OR PROGRAM

Not Applicable

BACKGROUND

The invention relates to an apparatus and method for eliminating juice splashes when a juicer machine is in operation. In particular, the invention is a juicer cover comprising elastic conical shaped fabric with an opening at the top edge formed by an elastic lip, and an opening at the bottom edge, also formed by an elastic lip. The bottom edge has a larger circumference than the top edge, and the elastic conical shaped fabric is capable of blocking and/or absorbing liquid to eliminate splash. The opening at the top edge is inserted around a feeding chute of the juicer machine and the elastic nature of the top edge ensures a snug fit. The top edge is also positioned to cover any openings in the vicinity of the feeding chute. The bottom edge is extended over the remainder of the juicer machine through the opening at the bottom edge so that the bottom edge covers at least a portion of the base of the juicer machine and at least the top portions of containers positioned under a pulp ejection spout and/or juice spout for collecting pulp and/or juice. While the juicer cover can be used with various types of juicer machines, the present invention is ideal for a centrifugal juicer machine.

Centrifugal juicer machines typically comprise utilize a Pusher (or plunger) inserted through a feeding chute. The pusher forces vegetables, fruits, nuts and other food, through the feeding chute, which are then processed by the juicer machine. Fibrous material exit through a pulp ejection spout and juices exit through a juice spout. Moreover, many juicer machines comprise various component parts put together, with spaces between each part. Over time, through normal wear and tear, these openings widen, causing juices to escape when the juicer machine is in operation. Because there are openings through the feeding chute, pulp ejection spout, juice spout, and in openings between each component part, operation of a juicer machine often results in leakage and splashes of juices and pulp. The splashes create a mess for the user each time the juice machine is in operation.

While some juice machines limit the amount of splash by enclosing either the pulp ejection spout or juice spout in chambers, the addition of chambers to limit the amount of splash adds to the cost and bulkiness of juice machines. Others inventions comprise a redesign of a juice machine to eliminate splash, for example, CN 102293577 B to Wang Zhiwei, which teaches a "Leak-proof juice centrifugal juicer juice fly," and U.S. Pat. No. 5,257,575 to Harrison, which teaches "Juice Extractors with Splash Prevention" in the form of a spray cap.

Known is U.S. Pat. No. 6,536,335 by Wallace (2002), which teaches a juicer cover. However, said juicer cover serves only to enclose a juicer cone and tray when the juicer machine is not in use. It does not serve to eliminate splash when a juicer machine is in use.

The objective of the present invention is to solve the problem of splashing when a juice machine is in operation, without the need for adding chambers or redesigning a juice machine. This problem can be solved in the form of an elastic juicer cover comprising a conical shaped body preferably made of fabric that can block and/or absorb juice splashes, and stretchable. The body of the cover has an opening at the top edge formed by an elastic lip, and an opening at the bottom edge, also formed by an elastic lip. The top edge has a circumference wide enough to wrap around a feeding chute or jumper, and the bottom edge has a circumference wide enough to enclose at least a portion of the base of a juicer machine, and at least a top portion of containers for collecting pulp and/or juice.

SUMMARY

The invention is a juicer cover, and method of use, which eliminates splashing when the juice machine is in operation. The juicer cover comprises a conical shaped body made preferably of stretch fabric that can block juice splashing and/or absorb liquid. The body has an opening at the top edge formed by an elastic lip, and an opening at the bottom edge, also formed by an elastic lip. The top edge has a circumference wide enough to wrap around a feeding chute or pusher of a juicer machine, and the bottom edge has a circumference wide enough to enclose at least a portion of the base of a juicer machine, and at least the top portion of containers used to collect juice and/or pulp.

DRAWINGS

REFERENCE NUMERALS

Figure 1:
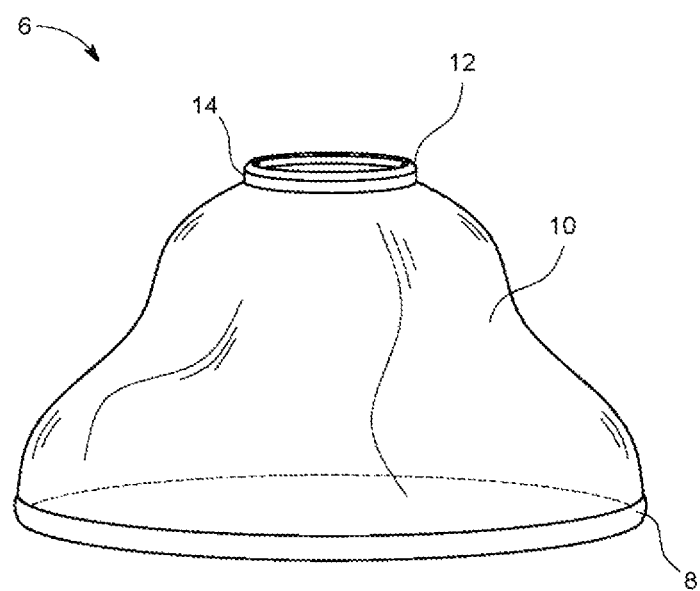
FIG. 1 shows an example of the inventive juicer cover

6 . . . juicer cover
8 . . . bottom edge
10 . . . body
12 . . . top edge
14 . . . elastic lip
16 . . . feeding chute
18 . . . pulp ejection spout
20 . . . juice spout
22 . . . base of juicer machine

DESCRIPTION

FIG. 1 shows the juicer cover 6, comprising a top edge 12 and a bottom edge 8. Each edge has an elastic lip 14. The juicer cover 6 has a conical shaped body 10 preferably made of elastic material, or stretch fabric, capable of blocking juice splashes. Preferably, the elastic material should be liquid absorbing (e.g., stretch cotton, stretch polyester) to minimize leakage, although any type of fabric (e.g., cotton, polyester, linen, nylon, acrylic, acetate) capable of acting like a shield against splashes is sufficient. The top edge 12 and bottom edge 8 both form a first opening and second opening, respectively, in the body 10 of the juicer cover. The first opening has a circumference wide enough to wrap around a feeding chute or pusher (not shown) of a juicer machine, and the second opening has a circumference wide enough to enclose at least part of the base of a juicer machine, and at least the top portion of at least one container for collecting pulp and/or juices under a pulp ejection spout 18 and/or a juice spout 20.

Figure 2:
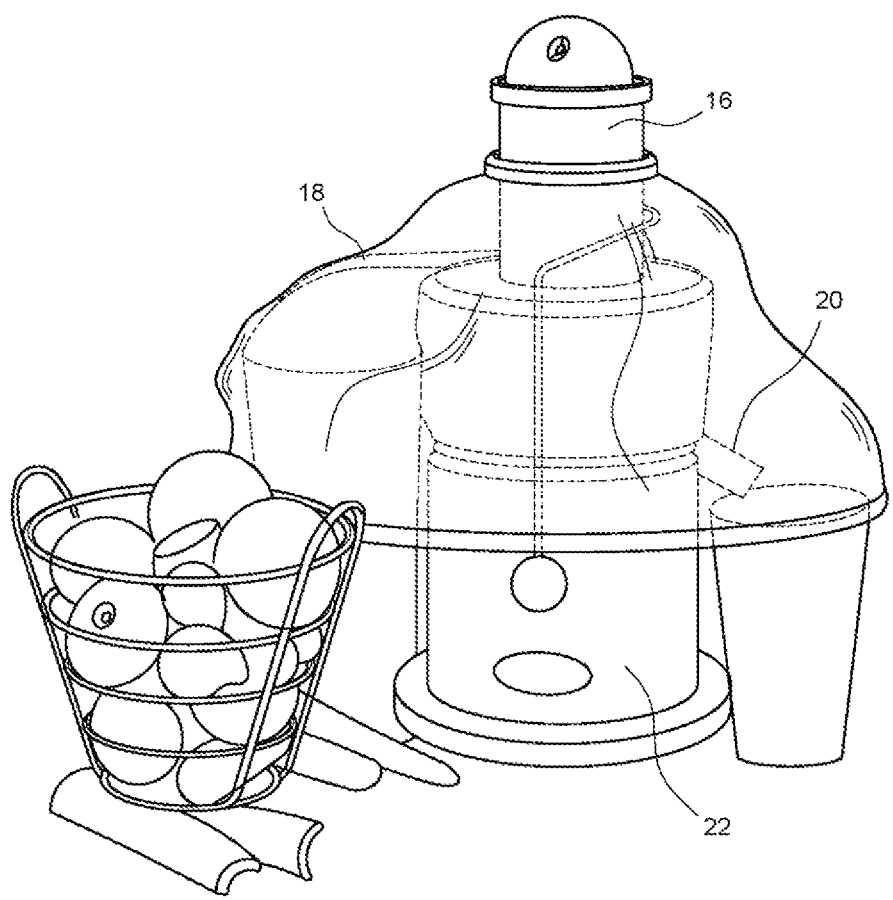
FIG. 2 shows the inventive juicer cover in use in connection with a typical juicer machine.

FIG. 2 shows a method of using the juicer cover 6. The body 10 of the juicer cover 10 is extended over the juicer machine so that the feeding chute 16 of the juicer machine passes through the first opening formed by the top edge 12 of the body 10. The top edge 12 should snugly fit around the feeding chute and cover any openings in the juicer machine within the vicinity of the feeding chute. Any containers for collecting juice and pulp extract are placed underneath the juice spout 20 and pulp ejection spout 18, respectively, and positioned as close as possible to the base 22 of the juicer machine. The second opening is then stretched around the base 10, pulp ejection spout 18, juice spout 20, and containers for collecting the juice and pulp extract, so that the bottom edge covers as much of the juicer machine and containers as possible. The juicer machine can then be turned on and any splashing or leakage that occurs is eliminated by the juicer cover 6.

In lieu of an elastic lip at the bottom and and top edges, it is too be understood that other means for enclosing a juicer cover around a juicer machine, including drapes, buttons, and hook and loop type fasteners, are conceivable. In lieu of an elastic body, it is to be understood that the body may be a single or double sheet, non-elastic material that encloses a juicer machine by means of fasteners.

All features disclosed in this specification, including any accompanying claim, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed:

1. A method for blocking juice splashes resulting from operation of a juicer machine comprising the steps of:
    covering a juicer machine with a conical shaped body of a juicer cover made of material capable of blocking juice splashes and having an area large enough to enclose the juicer machine,
    inserting an elastic first opening of the body of the juicer cover around a feeding chute of the juicer machine and positioning the first opening so that a top edge of the first opening fits snugly around the feeding chute while covering any openings in adjacent to the feeding chute;
    positioning at least one container for collecting juice and/or pulp under a juice spout and/or a pulp ejection spout, and as close as possible to a base of the juicer machine; and
    extending an elastic second opening of the body of the juicer cover over the remainder of the juicer machine so that a bottom edge of the second opening covers at least part of a base of the juicer machine and at least a top portion of the at least one container for collecting juice and/or pulp.

2. The method of claim 1, wherein the body of the juicer cover is composed of stretch fabric.

3. The method of claim 1, wherein the material is liquid absorbent.

4. The method of claim 1, wherein the top edge and the bottom edge are each defined by an elastic lip.

5. A juicer cover for preventing splash when a juicer is in operation, comprising: a conical shaped body with a first opening and a second opening, each of the first opening and second opening being elastic and constricted by one of an elastic lip, buttons, and/or hook and loop-type fasteners, the first opening having a circumference large enough to wrap snugly around a feeding chute or pusher of a juicer machine when expanded, and the second opening having a circumference large enough to enclose a base of the juicer machine and at least a top portion of at least one container for a pulp ejection spout and/or a juice spout of the juicer machine; wherein the body has an area sufficiently large and sufficiently small to snugly enclose the juicer machine, and wherein the body is composed of material capable of blocking juice splashes.

6. The juice cover of claim 5, wherein the material is capable of absorbing liquid to eliminate leakage.

7. The juice cover of claim 5, wherein the material is composed of stretch fabric.

\* \* \* \* \*